United States Patent
Moo Yeol et al.

[11] Patent Number: 5,084,799
[45] Date of Patent: Jan. 28, 1992

[54] LID LOCKING DEVICE FOR TAPE CASSETTE

[75] Inventors: Ryu Moo Yeol, Chungnam; Ryu Dae Ki, Seoul; Yun Duk Kyun, Chungnam; An Jae Kyu, Chungnam; Hong Sun Kuk, Chungnam; Hong Chang Euy, Chungnam; Ryu Su Sun, Chungnam, all of Rep. of Korea

[73] Assignee: SKC Limited, Kyungki, Rep. of Korea

[21] Appl. No.: 444,117

[22] Filed: Nov. 30, 1989

[30] Foreign Application Priority Data

| Dec. 6, 1988 [KR] | Rep. of Korea | 88-20133 |
| Dec. 7, 1988 [KR] | Rep. of Korea | 88-20189 |
| Dec. 7, 1988 [KR] | Rep. of Korea | 88-20190 |
| Dec. 7, 1988 [KR] | Rep. of Korea | 88-20197 |
| Dec. 9, 1988 [KR] | Rep. of Korea | 88-20295 |

[51] Int. Cl.$^5$ ............................................. G11B 23/02
[52] U.S. Cl. ................................... 360/132; 242/199
[58] Field of Search ................ 360/132; 242/197, 198, 242/199, 200

[56] References Cited

U.S. PATENT DOCUMENTS

4,628,389  12/1986  Tanaka et al. ................... 360/132
4,663,688  5/1987  Sasaki et al. ..................... 360/132

*Primary Examiner*—Andrew L. Sniezek
*Attorney, Agent, or Firm*—Ladas & Parry

[57] ABSTRACT

The present invention relates to a lid locking device for a video cassette having upper and lower cases and a lid mounted on the cases for movement between an open position and a closed position. The lid locking device comprises a lid lock having a pivot for mounting the lid lock within the upper and lower cases for pivotal movement between a lid locking position and a lid releasing position. The device further comprises a rounded groove in the upper side of a spring support member of the lid lock, a square projection on the lid lock comprising a convex portion, and a convex portion of the cassette at a point corresponding to the square projection.

3 Claims, 7 Drawing Sheets

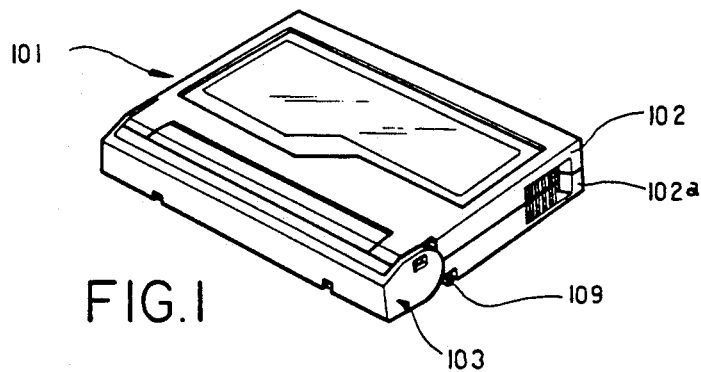
FIG.1
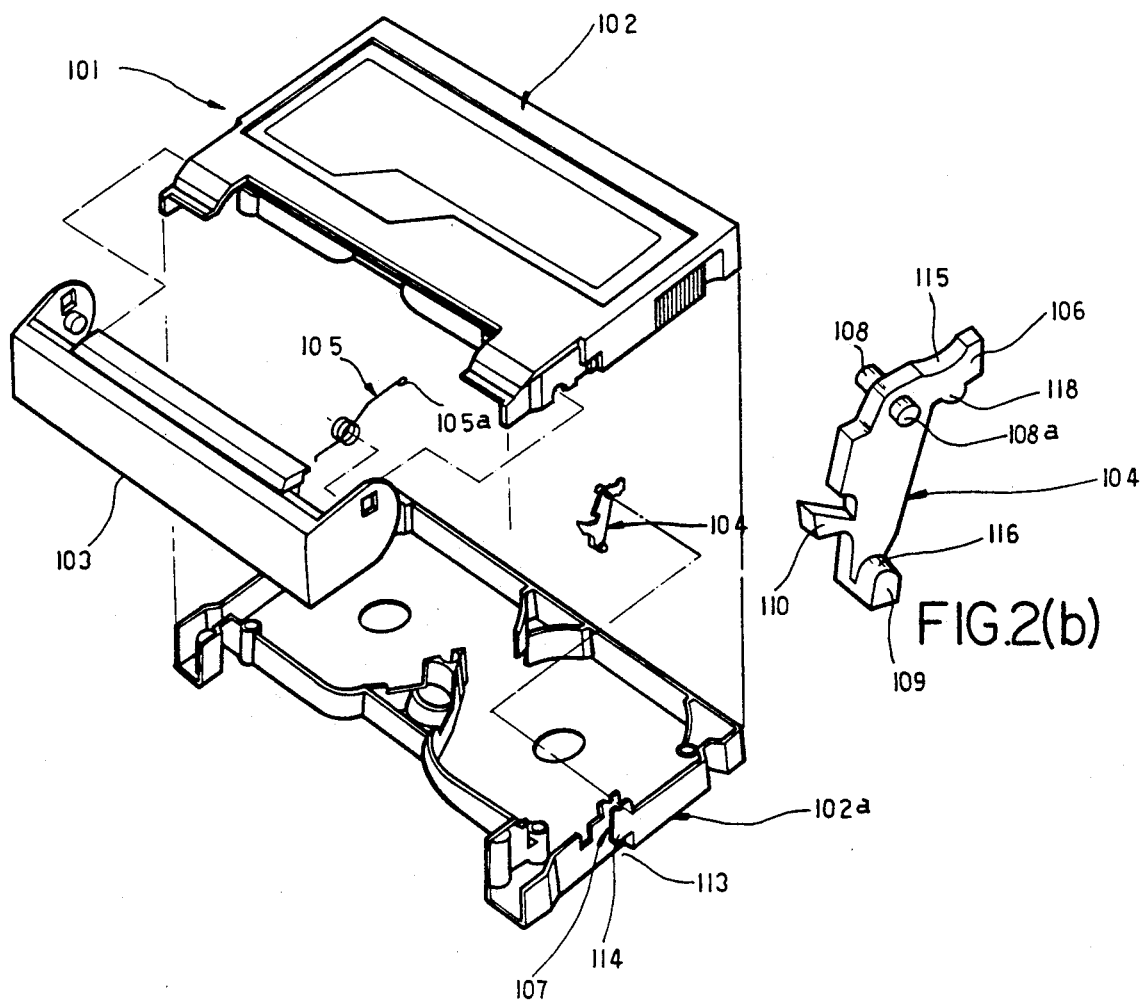
FIG.2(a)
FIG.2(b)

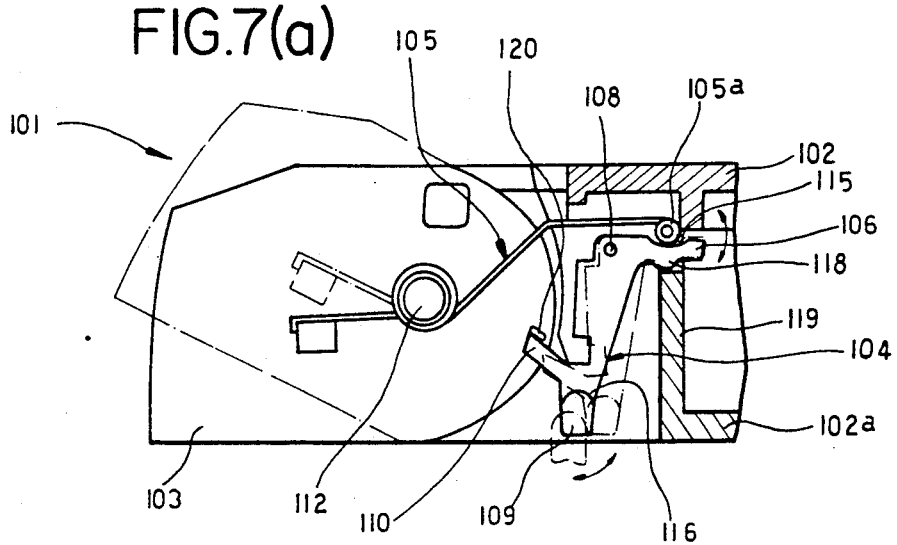
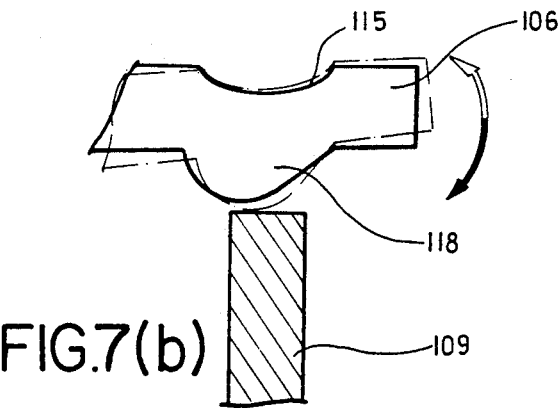
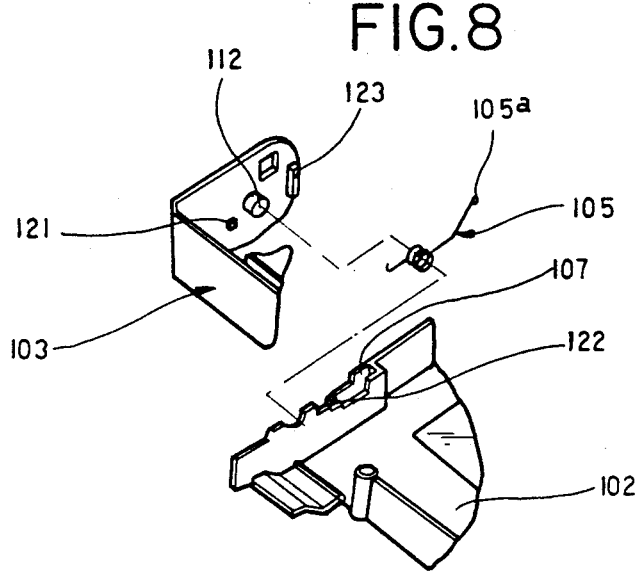

LID LOCKING DEVICE FOR TAPE CASSETTE

BACKGROUND OF THE INVENTION

The present invention relates to a tape cassette for a tape recorder (hereinafter referred to as VTR) and more particularly to a lid locking device of the tape cassette. The tape cassette is inserted into the VTR, wherein a tape is exposed for the tape cassette by opening the lid located at the front of the tape cassette. A drumhead of the VTR can contact the tape for reproducing audio and video signals recorded on the tape or for recording audio and video signals to the tape. When the tape cassette is ejected from the VTR, the tape is protected in the cassette by closing the lid.

DESCRIPTION OF THE RELATED ART

Conventionally, a magnetic tape cassette for use in the VTR is provided with a lid mounted to the front of the upper and lower cases of the tape cassette, and in the one side of the lid, a lid lock which locks and releases the lid is installed by a lid spring. When the tape cassette is loaded into the VTR, the lid lock by a release bar of the VTR is released and the lid is opened by the restoring force of the lid spring. When the tape cassette is ejected from the VTR, the lid lock locks the lid to protect the tape from external exposure.

In order to achieve these objects, the known lid locking device comprises a lid 3, mounted at the front of upper and lower cases 2 and 2a of the magnetic tape cassette 1, which can be opened and closed. A lid lock 4 is inserted into a lid lock inserting channel 7 formed to one side of the upper and lower cases 2 and 2a of the tape cassette 1 and has a spring support piece 6, swivel bosses 8 and 8a, a square projection 9 and a locking projection 10. A spring support piece 6 is supported by a bending portion 5a of a lid spring 5 mounted on an inner spring lock boss 12 of the lid 3. The end projection portion 14 is formed on the external lower part of the lid lock inserting channel 7 of the lower case 2a for forming a space 13. A lock and release bar (not shown) in the VTR is installed by the lid spring 5 so that a square projection 9 in the lid lock inserting channel 7 protrudes below the end projection portion 14 and is engaged by the bar. Therefore, when the magnetic tape cassette 1 is loaded into the VTR or ejected therefrom, the lid lock 4 is contacted with the lid spring 5 to lock or unlock the lid 3.

The conventional lid locking device is operated when the spring support piece 6 of the lid lock 4 and the bending portion 5a of the lid spring contact each other. The upper side of the spring support piece 6 of the lid lock 4 is retained in an horizontal state, with the result that the contact between the upper side of the spring support piece and the bending portion 5a of the lid spring 5 is not smooth. Therefore, a crack and a frictional resistance may be caused.

In this case, owing to the crack and the frictional resistance, locking and unlocking operations of the lid lock 4 also cannot be smoothly accomplished and thus an uncertain opening and closing operation of the lid 3 may be created.

In addition, the square projection 9 of the lid lock 4 inserted into the lid lock inserting channel 7 of upper and lower cases 2 and 2a of the tape cassette 1 is formed by a square shape. The corner of the end projection portion 14 formed on the external side of the lid lock inserting channel 7 of the lower case 2a has an angle so that the square projection 9 is extended to the external side. Therefore, where the lid 3 of the tape cassette 1 is moved, the lid lock 4 is swiveled and the square projection 9 is often jammed to the end projection portion 14 of the lower case 2a. Accordingly, because the lid 3 cannot accomplish an accurate movement of locking or releasing operations, the function of the tape cassette 1 may deteriorate and the life cycle is reduced since wear and tear may be generated due to a jam caused by the square projection 9 and the projection portion 14. Furthermore the noise of VTR, whether in playing or recording operation, is increased and the assembling work of the lid lock 4 by an assembler is very cumbersome because of the jam between the square projection and the end projection portion.

Further, where the locking projection 10 of the lid lock 4, inserted into the lid lock inserting channel 7 mounted on the upper and the lower cases 2 and 2a of the tape cassette 1 and supported by the lid spring 5 for locking and releasing the lid 3, is locked to an inner locking lug 20 of the lid by the elastic force of the lid spring 5, excessive locking may be created because of the lack of an extra lock stopping means, Therefore, when the lid 3 of the tape cassette 1 is released from the locking state, the releasing operation in the locking state of the lid 3 is not easily accomplished since the operation of the locking projection 10 of the lid lock 4 cannot be easily accomplished due to excessive locking. Thus, since an operation of the lock release bar within the VTR must be very large unnecessarily, the function of VTR is decreased. In addition, where the lid spring 5 is inserted between the upper and the lower case 2, 2a and the lid 3, the assembly of the lid spring 5 by an assembler is inconvenient due to the absence of an extra locking guide means for fixing the lid spring 5. Accordingly, the conventional locking device has many faults.

SUMMARY OF THE INVENTION

It is an objective to provide an improvement of a lid locking device of tape cassette which can eliminate drawbacks found in the above-mentioned prior art lid locking device.

In order to achieve the above-mentioned object, there is provided a lid locking device for a video cassette having upper and lower cases and a lid movably mounted on the cases for movement between an open position and a closed position. The lid locking device comprises a lid lock having pivot means for pivotally mounting said lid lock within the upper and lower cases for pivotal movement between a lid-locking position and a lid-releasing position, a rounded groove in the upper side of a spring support member of the lid lock, a square projection of said lid lock comprising a convex portion in the upper, and a corner of the end projection portion corresponding to the square projection, which is provided with a concave portion.

BRIEF DESCRIPTION OF THE DRAWINGS

The exact nature of this invention, as well as other objects and advantages thereof, will be readily apparent from consideration of the following specification relating to accompaning drawings, in which like reference characters designate the same or similar parts throughout figures thereof and wherein:

FIG. 1 is an overall perspective view that illustrates a tape cassette according to the present invention:

FIG. 2a is an exploded perspective view that illustrates the tape cassette of the present invention:

FIG. 2b is a perspective view of the lid lock shown in FIG. 2a;

FIGS. 7(a) and 7(b) are respectively enlarged side views of essentials according to a third embodiment of the present invention;

FIG. 8 is an exploded perspective view of essentials according to another embodiment of the present invention;

DETAILED DESCRIPTION OF THE INVENTION

Figure 3:
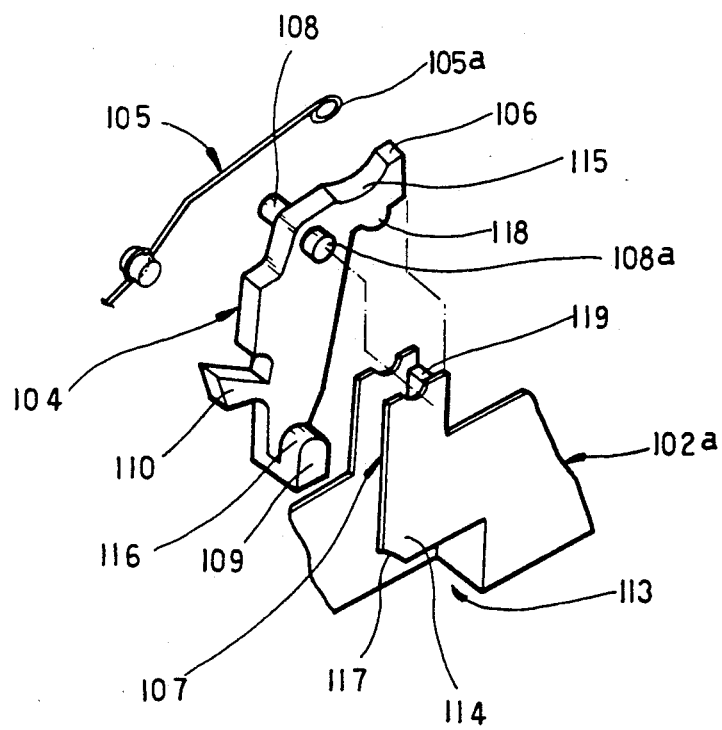
FIG. 3 is an enlarged perspective view of a portion of the cassette of the present invention
Figure 4:
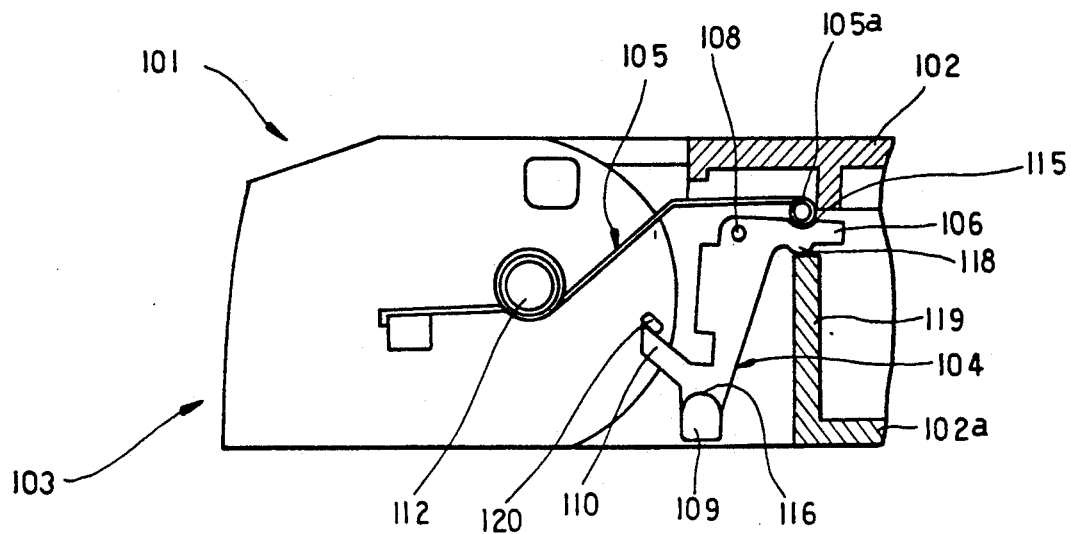
FIG. 4 is an enlarged side view that illustrates a combination of essentials of the present invention.

Referring to FIGS. 1, 2, 3 and 4, there is shown a video tape cassette to which a lid locking device according to the present invention is applied. The lid locking device comprises a lid lock 104 inserted into an inserting channel 107 formed on one side of two cases 102, 102a of a cassette 101, and a lid 103 supported by a lid spring 105 and movably mounted on the cases for movement between an open position and a closed position. The upper side of a spring support member 106 of the lid lock 104 for locking and releasing the lid 103 is provided with a rounded groove 115. An end of the lid spring 105 contacts and operates together with the rounded groove 115 in locking and releasing operations and is formed as a ring shaped portion 105a to smooth the contact operation between the lid lock 104 and the lid spring 105. The upper side of a lower square projection 109 of the lid lock 104 disposed within the lid 103 and inserted into the lid lock inserting channel 107 together with the lid spring 105 by the elasticity of the lid spring, and protruding from an end projection portion 114 of the lid lock inserting channel 107, is provided with a convex portion 116. A corner of the end projection portion 114 is provided with a concave portion 117 so that the lower projection 109 of the lid lock 104 is not jammed to the end projection portion 114 when the lid 103 is locked and released.

According to preferred embodiments of the invention, the lower side of the spring support member 106 of the lid lock 104 is provided with a projection 118. A rear part of the lid lock inserting channel 107 corresponding to the projection 118 is provided with a locking member 119 so that an excessive locking phenomenon is not created when a locking lug 110 of the lid lock 104 is locked to an inner locking lug 120 of the lid 103.

In addition, as shown in FIG. 8, an inner part of the lid 103 movably mounted on the front of the upper and the lower cases 102, 102a of the tape cassette 101 by the lid lock 104 and the lid spring 105 is provided with a spring fixing projection 121, a spring locking boss 112 and a spring guide locking projection 123 positioned at a higher position than a spring locking portion 122. Thus the lid spring 105 is easily coupled with the lid.

Figure 5A:
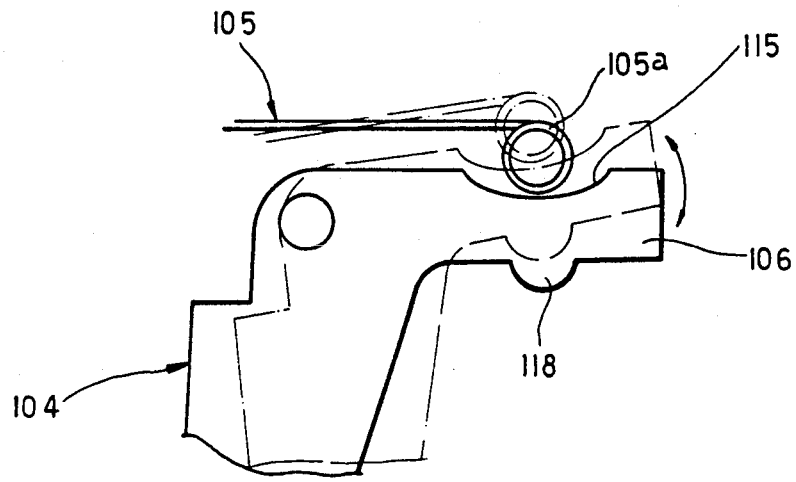
FIGS. 5(a) and 5(b) are respectively enlarged side views of essentials according to a first embodiment of the present invention.
Figure 5B:
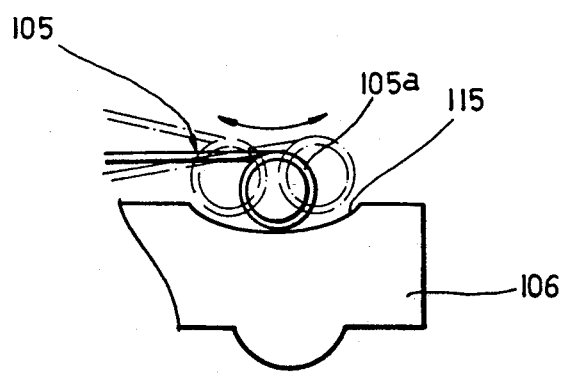

As shown in FIGS. 5(a) and 5(b), which are respectively enlarged side views according to the first embodiment of the present invention, the upper side of the spring support member 106 of the lid lock 104 is to be swiveled for locking and releasing the lid 103 when the magnetic tape cassette 101 is loaded to the video tape recorder (not shown) or ejected therefrom. The end of the lid spring 105 contacts the rounded groove 115 and the elasticity to the lid lock 104 is provided by the ring shaped portion 105a. Therefore, locking and releasing operations of the lid lock 104 can be accomplished smoothly since the groove 115 of the spring support member 106 and the ring shaped portion 105a of the spring 105 contact each other in a sliding manner and the lid lock 104 is swiveled.

Thereby, opening and closing operations of the lid 103 can be accomplished smoothly to protect against the scraping phenomenon of the lid lock.

Figure 6A:
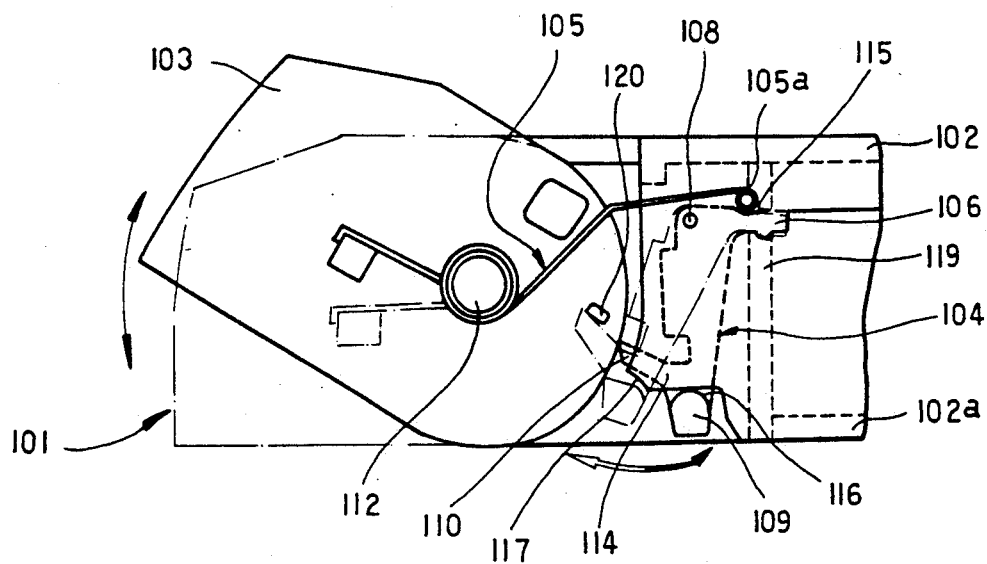
FIGS. 6(a) and 6(b) are respectively enlarged side views of essentials according to a second embodiment of the present invention.
Figure 6B:
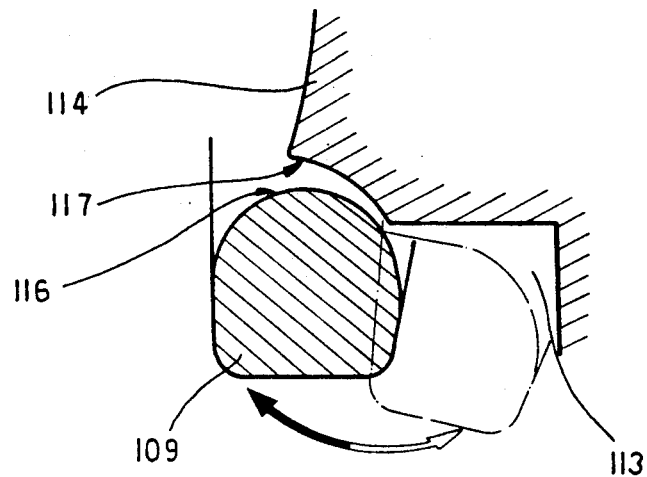

In FIGS. 6(a) and 6(b), there are shown respectively enlarged side views according to the second embodiment of the present invention. The upper side of the lower square projection 109 of the lid lock 104 is provided with the convex portion 116 and the corner of the external end projection portion 114 of the lid lock inserting channel 107 corresponding to the convex portion is formed by the concave portion 117 so that the lower projection 109 of the lid lock 10 is not jammed to the end projection portion 114 when the lid lock 104 is swiveled in locking and releasing operations of the lid 103.

Thus the lid 103 can accomplish correct locking and releasing operations. Consequently, an abrasion between the end projection portion 114 and the square projection 109 of the lid lock 104 is substantially avoided.

In FIGS. 7(a) and 7(b), there are shown respectively enlarged side views according to the third embodiment of the present invention. The upper side of the spring support member 106 of the lid lock is provided with the stop projection 118 and the rear part of the lid lock inserting channel 107 corresponding to the projection is provided with the locking member 119. In this way, an excessive locking phenomenon of the locking lug 110 of the lid lock 104 is not created since the stop projection 118 is contacted with the locking member 119 when the lower locking lug 110 of the lid lock 104, by the elasticity of the lid spring 105, is locked to the inner locking lug 120 of the lid 103. Therefore, the releasing operation from the locked state of the lid can be made smoothly.

Figure 9A:
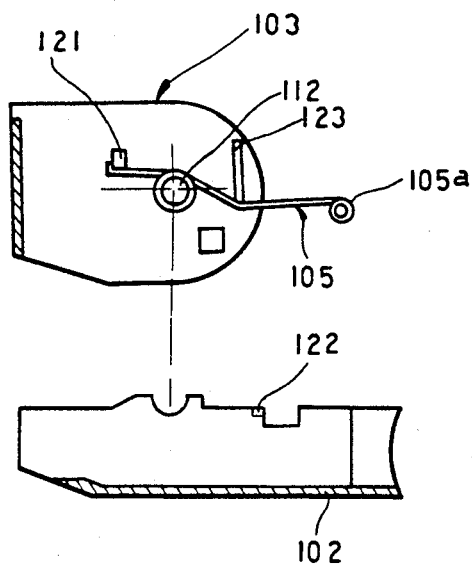
FIGS. 9(a), 9(b) and 9(c) are respectively sectional views of essentials according to the another embodiment of the present invention.
Figure 9B:
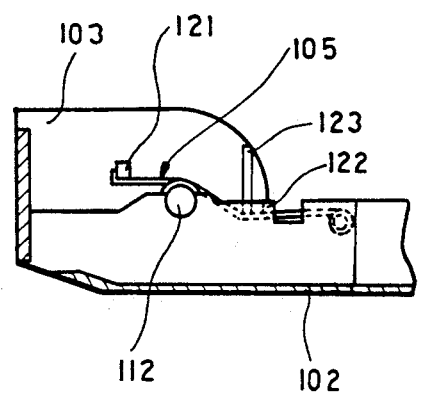
Figure 9C:
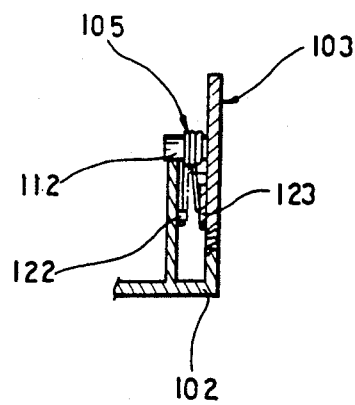
Figures 10A, 10B:
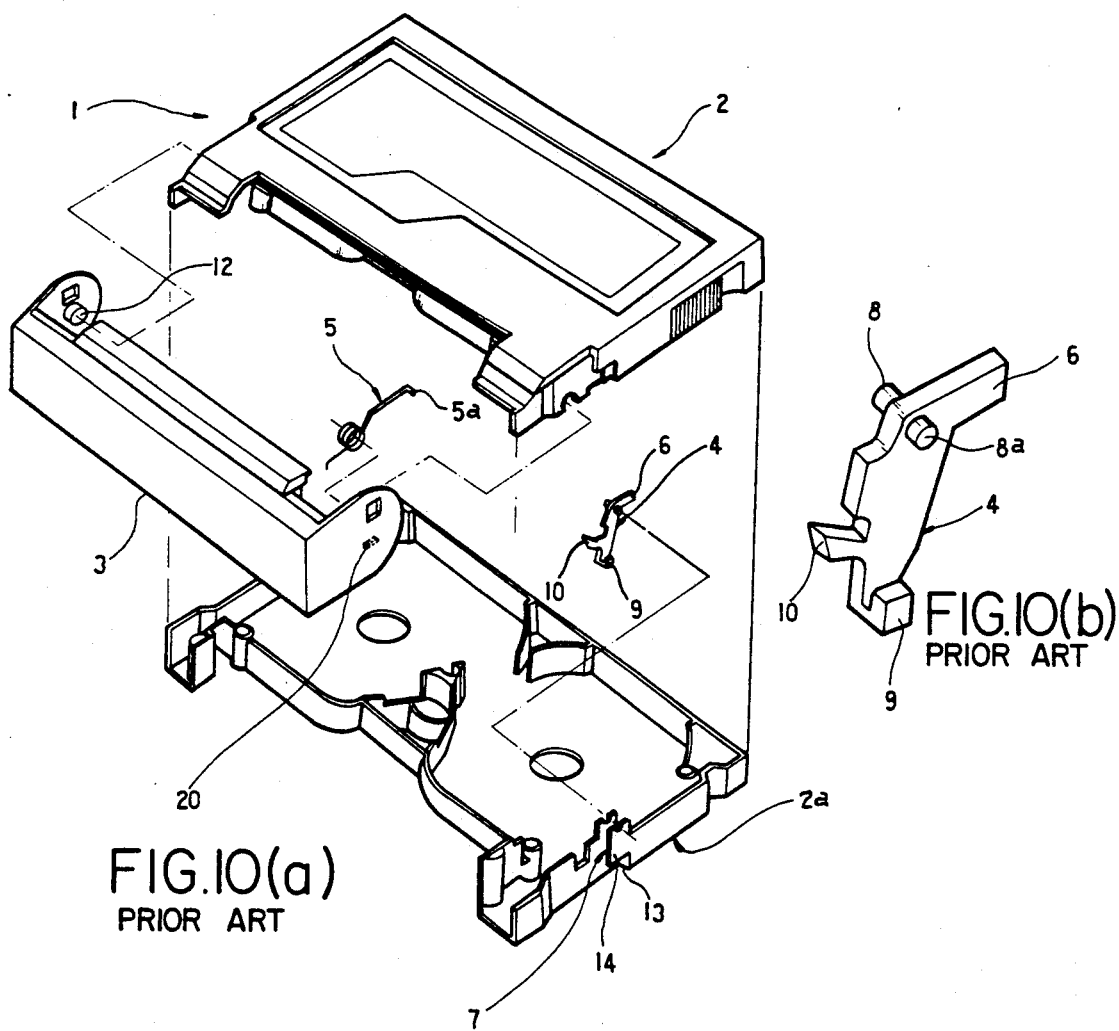
FIGS. 10(a) and 10(b) are an exploded perspective view that illustrates a tape cassette according to prior art.

In FIGS. 9(a) to 9(c), there are shown respectively sectional views according to another embodiment of the present invention. On the inner part of the lid 103 mounted on the front of the magnetic tape cassette 101 for movement between an open position and a closed position, there is provided a spring fixing projection 121, a spring locking boss 112 and a spring guide locking projection 123 positioned above the spring locking portion 122.

If the lid spring 105 is fabricated on the lid, the lid spring 105 is inserted into the spring locking boss 112 mounted on the inner part of the lid 103. One end of the lid spring is locked to the spring fixing portion 121 and the other end of the lid spring is locked to the spring guide locking projection 123. The lid spring is coupled to the upper case 102 and the lid, and assembly of the lid spring is easily achieved since one end of the lid spring 105 locked to the inner spring guide locking projection 123 is separated from the projection 123 and lock to the spring fixing portion 121 mounted on the upper case 102.

As has been described hereinbefore, in accordance with the present invention, the upper side of the spring support member of the lid lock for locking and releasing the lid when the magnetic tape cassette is loaded to the video tape recorder or ejected therefrom is provided with the rounded groove. One end of the lid spring which supports this groove by the elasticity is formed as the ring shaped portion and thus a swivel operation of the lid lock and locking and releasing operations of the lid can be accomplished smoothly. The scraping phenomenon on the spring support member of the lid lock and a noise of the video tape recorder is substantially avoided.

Owing to this, the magnetic tape cassette according to the present invention can provide enhanced quality and durability.

In addition, the upper side of the lower projection of the lid lock for locking and releasing the lid in the magnetic tape cassette is provided with the convex portion and the end projection portion of the lid lock inserting channel of the lower case is provided with the concave portion so that the lower projection of the lid lock is not jammed to the end projection portion of the lower case where the lid lock is swiveled to lock and release the lid of the magnetic tape cassette. Owing to this, locking and releasing operations of the lid are accomplished correctly to protect and impact between the lower projection of the lid lock and the end projection portion of the lower case. Consequently, jamming between the tape cassette and the video tape recorder can be reduced to increase their functions.

Accordingly life cycle of the tape cassette can be extended. Further, since the lower side of the spring support member of the lid lock is provided with the stop projection and the rear part of the lid lock inserting channel of the lower case is provided with the locking member, when the lower locking lug of the lid lock is swiveled to lock the inner locking member of the lid by the spring elasticity of the lid spring, upper stop projection lid lock is locked to the locking member of the lid lock inserting channel of the lower case and stops the locking operation. At the same time, the excessive locking phenomenon of the lid is protected and thus the releasing operation from the locking state of the lid can be smoothly made. Consequently, the operational range of the locking release bar of the video tape recorder is not unnecessarily large and the video tape recorder can be enhanced in its function. Further the lid can accomplish the releasing operation smoothly and the tape cassette can rise in quality and durability.

In addition, since the spring fixing projection, the spring locking boss and the spring guide locking projection positioned above rather than the spring locking portion of the upper case is installed on the inner part of the lid for supporting the lid lock for locking and releasing the lid of the magnetic tape cassette and for easily coupling the spring inserted into the inner part of the lid, and where the lid spring is inserted into the spring locking boss and one end of the lid spring is locked to the spring guide locking projection, and coupled with the upper case one end of the lid spring is separated from the spring guide locking projection and locked to the spring fixing projection of the upper case and the assembly works of the lid spring is easy, the present invention may achieve the effect of reducing the rate of the assembly loss of the lid spring and increase the value economically by preventing the loss of the spring in the assembly work of the lid spring, as well as the working ability and the productive capacity to reduce the assembly time of the lid spring.

It should be understood, however, that there are no intentions to limit the invention to the specific forms disclosed but on the contrary the invention is to cover all modifications, alternate constructions and equivalents falling within the spirit and scope of the invention as expressed in the appended claims.

What is claimed is:

1. A lid locking device for a tape cassette having an upper case, a lower case and a lid mounted on the upper and lower cases for movement between an open position and a closed position, the lid locking device comprising:
   a lid lock pivotally mounted in the tape cassette for pivotal movement between a lid locking position and a lid releasing position;
   a lid spring urging the lid into the closed position;
   contact means on the lid lock for receiving the lid spring to facilitate smooth locking and releasing operation between the lid lock and lid spring, the contact means comprising a rounded groove on the lid lock and a ring-shaped portion on the lid spring, the ring-shaped portion being received in the rounded groove when the lid lock is moved to facilitate smooth movement therebetween;
   means on the lid lock for preventing jamming between the lid lock and the tape cassette during movement of the lid lock between the lid locking position and lid releasing position; and
   locking control means on the lid lock located between the lid lock and the tape cassette for eliminating excessive wear therebetween 2. A lid locking device as claimed in claim 1 wherein the means for preventing jamming comprises a convex portion on a lower projection of the lid lock, and a concave portion on an end projection of the lower case at a point corresponding to the convex portion.

3. A lid locking device as claimed in claim 1 wherein the locking control means comprises a stop projection on the lid lock and a locking member on the lower casing at a point corresponding to the stop projection.

* * * * *